United States Patent

Bradford et al.

[15] 3,684,101
[45] Aug. 15, 1972

[54] TOOL LOADER AND UNLOADER
[72] Inventors: Glenn H. Bradford, 744 Streetsboro Road, Peninsula, Ohio 44264; John S. Elewski, 2540 St. Francis St., Akron, Ohio 44313
[22] Filed: Sept. 21, 1970
[21] Appl. No.: 73,713

[52] U.S. Cl. ................................ 211/1.5, 29/568
[51] Int. Cl. .......................................... A47f 3/08
[58] Field of Search ............... 211/1.5; 29/26, 568

[56] References Cited

UNITED STATES PATENTS

| | | | |
|---|---|---|---|
| 2,673,778 | 3/1954 | Wood | 211/1.5 X |
| 2,834,479 | 5/1958 | Kayton | 211/1.5 X |
| 2,860,534 | 11/1958 | Nelson | 211/1.5 X |
| 3,074,147 | 1/1963 | Miller | 29/26 |
| 3,217,406 | 11/1965 | Dever | 29/568 |
| 3,218,706 | 11/1965 | Zankl | 29/568 |
| 3,276,116 | 10/1966 | Stark | 29/568 |
| 3,286,344 | 11/1966 | Brainard | 29/568 |

*Primary Examiner*—Nile C. Byers, Jr.
*Attorney*—Freeman & Taylor

[57] ABSTRACT

A tool storage device featuring a plurality of tool holding pockets with means to progressively advance said pockets past a loading and unloading station in a predetermined sequence whereby foolproof tool storage is facilitated. The device includes means for locking the tools in the pockets and automatically releasing the lock when the appropriate pocket reaches the loading and unloading station so that only the appropriate tool can be removed in the appropriate sequence.

4 Claims, 8 Drawing Figures

INVENTORS
GLENN H. BRADFORD &
JOHN S. ELEWSKI
BY
Freeman & Taylor
ATTORNEYS

PATENTED AUG 15 1972 3,684,101
SHEET 2 OF 3

INVENTORS
GLENN H. BRADFORD &
BY JOHN S. ELEWSKI

Freeman & Taylor

ATTORNEYS

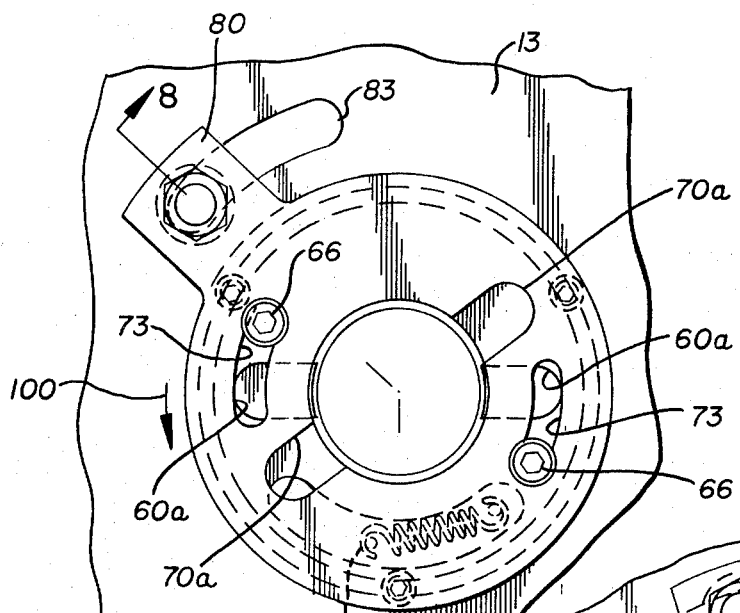
FIG. 5
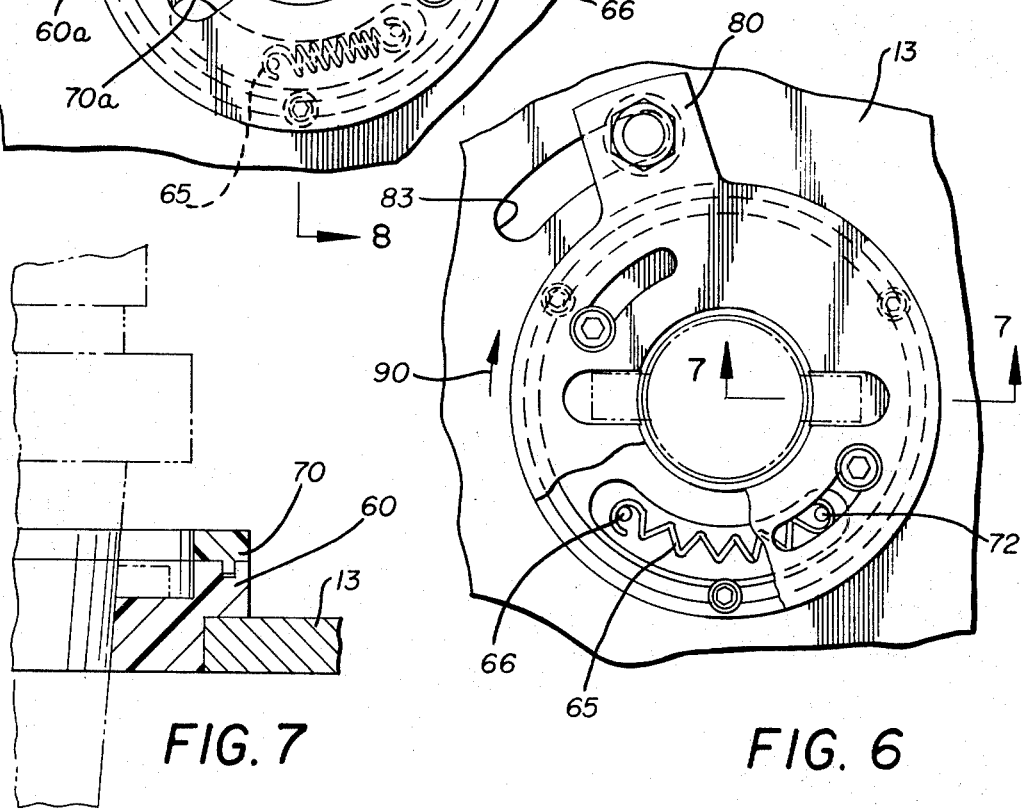
FIG. 7
FIG. 6
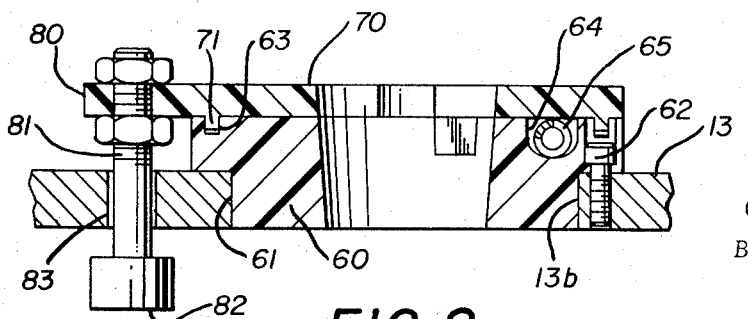
FIG. 8

TOOL LOADER AND UNLOADER

BACKGROUND OF THE INVENTION

This invention relates to the field of article handling and in particular relates to an improved type of tool storage unit that is adapted for temporary storing of tools in a proper pre-determined sequence so as to permit progressive use of these tools in proper order during a machining operation.

In the machining of finished parts, it is customary that several tools will be used in the same machine, in sequence, to effectuate the various cuts, chamfers, etc., that are required to machine the part to its completed form.

With the advent of tape-controlled machine tools within the last decade, operation of the machine is more or less automatic as to positioning the tool but such operations still require that the operator change tools to effectuate different operations.

For example, holes of one size may first have to be drilled in accordance with dimensions established by the tape-controlled machine. These holes may then have to be counter-sunk or otherwise modified with the result that a separate and distinct tool is required.

Since the machine operates sequentially with respect to tape-controlling the same, it is essential that the tools be placed in the operating portion of the machine in the proper sequence.

If the sequence is broken, the wrong tool will be performing the wrong machining function at the wrong time with the result that the part will invariably have to be scrapped.

DESCRIPTION OF THE PRIOR ART

At the present time, the known prior art consists of two widely varied extremes.

On the one hand, there are rather sophisticated tool handling machines of the type set forth in Gleisner U.S. Pat. No. 3,163,291 and Sedgwick U.S. Pat. Nos. 3,176,847 and 3,052,999. In these units, the tools are stored in a container, coded, and retrieved therefrom by an automatic programming operation. In the instance of the Gleisner reference, this is accomplished by coding arrangements and in the Sedgwick patents by a plurality of trip fingers.

The other extreme is the mere manual handling of the tools in what is hoped will be the proper sequence. In this instance, the operator selects his tooling, lays it on a work bench, and hopefully follows the proper sequence in inserting the tool in the machine.

SUMMARY OF THE INVENTION

The present invention represents a compromise between the extremes of the prior art as above-discussed. It envisions a tool holder that includes a series of tool-receiving pockets within which tools may be inserted in their proper sequence. This unit then progressively advances to an unloading station. Preferably, the unit will include some form of locking mechanism to maintain the tools in place except when the same reach the loading and unloading station. At this time, the tool at the unloading station will be free to be removed and placed in the machine and there will be an open pocket into which the tool being removed from the machine can be inserted.

Thus, all the advantages of the sophisticated and expensive tool handling equipment can be achieved while having a device that is foolproof in operation and relatively inexpensive.

Production of a tool changer having the above characteristics accordingly becomes the principal object of this invention with other objects thereof becoming more apparent upon a reading of the following brief specification considered and interpreted in view of the accompanying drawings.

Figure 2:
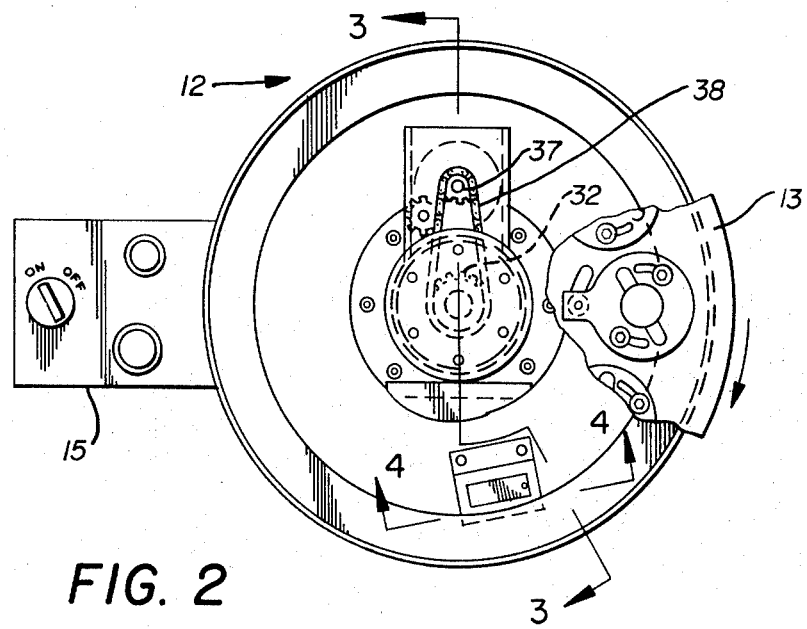
FIG. 2 is a vertical section taken of the lines 2—2 of FIG. 1.
Figure 3:
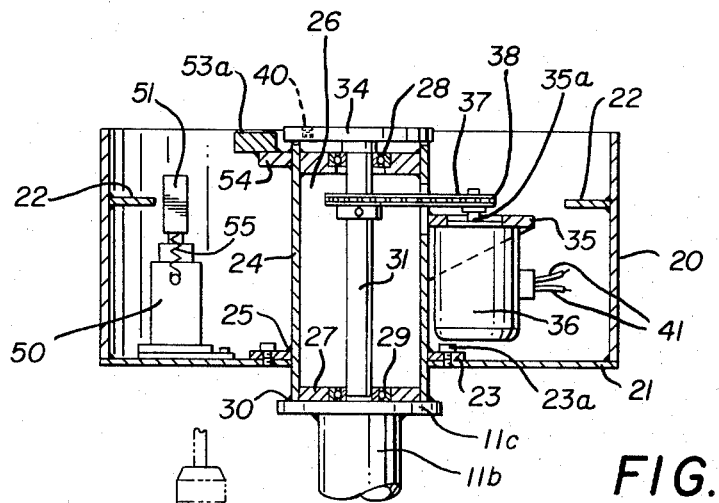
Figure 4:
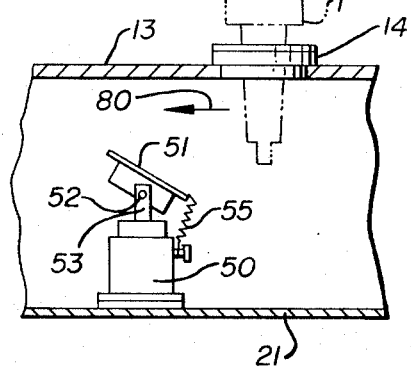

FIGS. 3 and 4 are sectional views taken respectively on the lines 3—3 and 4—4 of FIG. 2.

FIGS. 5 and 6 are plan views of a typical individual tool-receiving pocket. FIG. 5 is illustrative of the units in a locked condition while FIG. 6 shows the same in an open position.

FIGS. 7 and 8 are sectional views taken respectively on the lines 7—7 of FIG. 6 and the lines 8—8 of FIG. 5.

BRIEF DESCRIPTION OF THE PREFERRED EMBODIMENT

Figure 1:
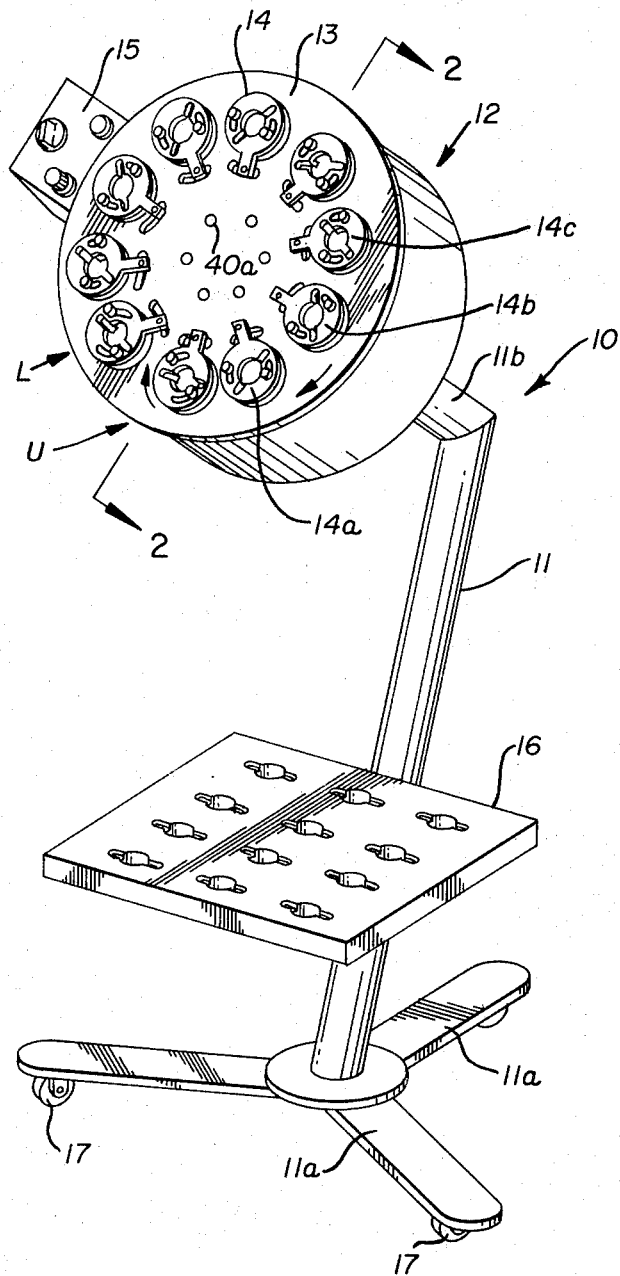
FIG. 1 is a perspective view illustrating the improved tool changer.

Referring first to FIG. 1 of the drawings, the improved tool changer, generally designated by the numeral 10, includes a support frame 11 that receives a head unit 12 with the arrangement being such that the head unit 12 includes a relatively movable support plate 13 that supports a plurality of tool-receiving pockets 14,14 as clearly shown in FIG. 1. Control panel 15 and a storage stand 16 complete the structural components with casters 17,17 being shown on legs, 11a,11a of frame for the purpose of illustrating the portability of the unit 10.

It should be noted here that while a unique support stand having portable characteristics has been illustrated, the tool exchanger could also be mounted on the bed of the tool or any other suitable surface close to the operator if desired.

Referring next to FIGS. 2 through 4, it will be first noted in FIG. 2 that the support plate 13 has been broken away throughout most of its area so as to illustrate the internal components of tool changer 10. Accordingly and as shown in FIGS. 2 and 3, the head unit 12 includes a cylindrical shell 20 to which is welded a bottom base plate 21 with rigidity being added to the unit by the presence of an annular ring component 22 that projects radially inwardly from the walls of shell 20 as shown in FIG. 3.

The bottom base plate 21 is provided with a central bore over which is superimposed a plate 23 with a through central opening that is secured to the base plate 21 by bolts 23a,23a. A central cylinder 24 projects through the bore in bottom plate 21 on the opening in plate 23 and is welded to the plate 23 as at 25, and upper and lower rings 26 and 27 are also welded to the cylinder 24 internally thereof so as to provide a housing for bushings 28 and 29. The upper arm portion 11b of frame 11 has a plate 11c thereon that is welded to the cylinder 24 as at 30.

Journaled within the bearings 28 and 29 is a shaft 31 having a sprocket 32 pinned thereto as shown best in FIG. 2. A cover plate 34 is secured to the upper end of the shaft 31 and moves relatively of the cylinder 24. Framework 35 projects externally from the wall of cylinder 24 as shown in FIG. 3 for the purpose of supporting a motor 36, with the drive motor carrying a sprocket 37 on shaft 35a so that a chain 38 can be employed to interconnect sprockets 32 and 37 to effectuate rotation of shaft 31 and plate 34 upon actuation of motor 36.

Tapped threaded holes 40,40 are also provided in the outboard face of the plate 34. By this arrangement, this cover plate 34 can be attached to support plate 13, which has corresponding tapped holes 40a,40a, by bolts so that the support plate 13 can be supported in relatively rotatable relationship with the housing 20.

Electrical wires 41,41 connect the motor 36 with the control panel 15 in known manner and also with a control mechanism 50 to control the just-described rotation of the plate 13 relatively of housing 20.

Referring next then to FIG. 4, there is illustrated in broken lines a typical tool-receiving pocket 14 having a tool T received therein. It will be noted that the tool holder is received on the plate 13 and further that the tool T projects beneath the surface of plate 13 to a considerable extent as shown in FIG. 4.

By this arrangement, when the tool T moves in the direction of the arrow 80, it will automatically come into contact with a movable lever plate 51 that is pivotally mounted as at 52 on an appropriate yoke 53 of a control mechanism 50 which is, in turn, mounted on base plate 21. Spring 55 normally maintains the control unit in the position of FIG. 4.

The unit 50 is in reality a simple electrical control having an "on"/"off" function and with the unit normally being "on" in the position of FIG. 4 so that it will operate the drum until such time as a depending portion of a tool strikes the lever plate 51 and moves the same to a horizontal position overcoming the force of spring 55. When this happens, the motor 36 will be de-energized with proper electrical circuits and rotation will stop. It will be noted from FIG. 2 that unit 50 is positioned just ahead of the lower vertical portion of the tool so as to be in alignment with the unloading station U, shown in FIG. 1. Loading station L would be the next adjacent station clockwise.

It has been noted in the previous paragraphs that the preferred form of the invention envisions an operation wherein the tools are locked in place at all times except when the same are in the unloading position and, to this end, it is best shown in FIGS. 2 and 3. The cylinder 24 includes a cam plate 53a that is arcuate in plan so as to effectuate a camming operation on the individual tool holders 14 during the time that the same are in the loading and unloading stations. An appropriate support 54 is mounted on cylinder 24 and supports the cam plate 53a as best shown in FIG. 3, and the coaction of plate 53a with the tool-receiving pockets 14,14 will be described more fully below.

Turning now to FIGS. 5 through 8 for a detailed description of the individual tool pockets 14,14, the same are generally of two-piece construction as shown in FIG. 7 so as to include a base portion 60 fixed to plate 13, and a relatively movable cover or locking plate 70 that has limited rotational pivoting movement with respect to the base plate 60 as will be subsequently described.

Referring to FIG. 8 now, it will be noted that each base plate 60 has a reduced diameter shank portion 61 that is intended to be received within the bore 13b that is provided in the plate 13 with the base member 60 being secured to the plate 13 by a conventional threaded bolt arrangement that includes the bolt 62 as best shown in FIG. 8. An arcuate groove 63 in base plate 60 receives the projecting rib 71 from the cover plate 70 so as to permit rotation of the cover plate 60 around the common axis of plates 60 and 70.

Referring now to FIGS. 5, 6 and 8, it will be noted that each base plate 60 is provided with an arcuate recess 64 in its top surface within which a spring 65 may be received with spring 65 having its ends secured respectively to a pin 66 extending upwardly in recess 64, and a pin 72 depending downwardly from the lower surface of cover plate 70. By this arrangement, the spring urges the cover plate 70 into the locked position of FIG. 5.

Turning now to consideration of the cover plate details, it will first be noted that the same has, as best shown in FIG. 5, opposed arcuate slots 73,73 with these slots cooperating with bolts 66,66 that are threaded into appropriate openings in the upper surface of the base plate 60 as best illustrated in FIGS. 5 and 6 of the drawings.

The purpose of the just-mentioned construction is to permit alignment between the opposed openings 60a,60a in the base plate 60 and the opposed openings 70a,70a that are provided in the cover plate 70. When these openings are aligned, as in FIG. 6, it will be noted that even though the spring is urging the cover plate in a clockwise direction that the bolt 66 has engaged the end of the slot 73 so as to permit exact alignment of the opposed openings 60a,60a and 70a, 70a. Thus, in this open position, the ears of the tool T can be freely inserted into the openings 60a,60a of the base member. On the other hand, when the spring 65 retracts and the unit moves to the position in FIG. 5, a substantial portion of the openings 60a,60a will be covered by the cover plate 70 and thus the tool T will be firmly secured in place.

For the purpose of effectuating the camming action previously indicated, each cover plate 70 has a radial extension arm 80 (see FIGS. 5, 6 and 8) from which depends a pin 81 having a cam roller 82 with the shank of the pin 81 being designed to reciprocate within an arcuate slot 83 provided in the plate 13, as clearly shown in FIGS. 5, 6 and 7. This cam roller 82 is intended to engage the cam plate 53a and as this happens the unit will be pivoted in the direction of arrow 90 from the locked position of FIG. 5 to the open position of FIG. 6 thus overcoming the force of spring 65.

However, when the cam roller 82 disengages the cam plate 53a, the spring 65 will return the parts in the direction of arrow 100 to the position of FIG. 5.

OPERATION OF THE DEVICE

While the operation of the device is believed apparent from the foregoing detailed description, the same will be summarized for the purpose of clarity at this point.

It will first be assumed that the tools T have been first set in their holders in the proper sequence and, at this time, the tools will be inserted into the tool-receiving pockets on a counter-clockwise basis with tool Number 1 being inserted in holder 14a, tool Number 2 in holder 14b, and tool Number 3 in holder 14c, until all tools required for the particular operation are installed. In the form illustrated, the tool openings are shown arranged in a circular pattern but it is believed apparent that neither the number of the pattern is important as long as the same serve the function of progressively moving these holders to the loading and unloading stations.

Assuming the tools to be loaded and assuming that the tool shown in FIG. 4 is tool Number 1, as the machine is turned on, this tool will rotate clockwise until such time as the depending portion thereof trips the lever 51 by virtue of having made contact with the same.

Just prior to this, the cam roller 82 of this tool holder will have engaged the cam plate 53a and the pocket will have moved to the open position of FIG. 6 by the time the machine stops. At this time, the tool T can be removed and inserted into the spindle of the machine. When the tool T is removed, as just described, the spring 55 will return the lever to the position shown in FIG. 4 at which time rotation will resume until the tool in holder 14b strikes the lever 51 and again stops the machine. The machine will remain in this position until the operator has concluded the use of the first tool. When the use of the first tool has been completed, the operator will then remove the same from the spindle and insert it in the only open pocket available; namely, the pocket that is in the loading station, with it being noted that all other pockets will be in the closed position of FIG. 5.

When the operator has inserted it in the closed position, he removes the tool then in the unloading station and this causes a repetition of the just-described sequence with the tool that was first used now being locked in place by virtue of no further contact between cam plate 53a and cam roller 82. In the event, for example, that six tools are being used, it is believed apparent that this will not slow down the operation because of the instances where empty tool pockets are provided, these tool pockets will merely pass over the control mechanism 50 with the result that the machine will not again stop until it is to be engaged for the next tool to be used.

It is believed apparent from the foregoing paragraphs that a low cost, foolproof tool storage device has been achieved and while a preferred embodiment has been shown, it is to be understood that the invention is not to be limited to this embodiment. Thus, it is conceived that a vacuum tube could be employed in connection with the control mechanism so as to delay the start-up when a tool is removed from an unloading station. This would be particularly desirous in instances where heavy tooling is involved where movement would be hazardous to the operator once the tool was only part way out of the pocket.

Also, it is contemplated that a solenoid type of brake could be employed to lock the unit against inadvertent rotation in the event the tools were off center and were heavy in nature. The brake would be triggered by depression of the lever 55 being tripped as earlier described and would remain in the braking position until such time that the tool is removed.

While a full and complete description of the invention has been set forth in accordance with the dictates of the Patent Statutes, it is to be understood that the invention is not intended to be limited to the precise embodiment shown. Accordingly, these and other modifications of the invention can be resorted to without departing from the spirit hereof or the scope of the appended claims.

What is claimed is:

1. A device for storing tools to ensure use thereof in proper sequence, comprising;
   A. a frame;
   B. a tool receiving plate
      1. carried by said frame in relatively movable relationship therewith and
      2. having a plurality of successively arranged toolholder openings each of which has a normally closed cover;
   C. motive means
      1. operatively associated with said tool receiving plate and adapted to move said plate relatively of said frame in a predetermined path of movement;
   D. said toolholder openings each being adapted to pass successively through an unloading and a loading station upon movement of said tool receiving plate;
   E. means for moving each of said locking covers to open position during movement thereof through said unloading and loading stations;
   F. switch means
      1. operatively associated with said motive means and
      2. adapted to engage a portion of a first tool and inactivate said motive means when said tool reaches said unloading station; and
   G. said switch means automatically activating said motive means and moving the next tool into said unloading station upon removal of the first tool from said toolholder opening.

2. The device of claim 1 further characterized by the presence of
   A. tension means carried by said plate and normally urging said covers to closed position; and
   B. said means for moving said covers to open position include
      1. cam means carried by said covers and said frame and urging said covers to open position when said plate is moved through said unloading and loading station.

3. The device of claim 1 further characterized by the fact that said motive means include
   A. a motor
      1. carried by said frame and
      2. operatively connected to said plate; and
   B. said switch means including
      1. a control unit carried by said frame
      2. operatively connected to said motor and
      3. adapted be deactivated by contact with a portion of each said tool.

4. The device of claim 1 further characterized by the presence of
   A. a base plate
      1. secured to said tool receiving plate in overlying relationship to each of said toolholder openings and 2. having an opening adapted to receive the shanks of said tools;

B. said cover plates being secured to said base plates for limited rotational movement relatively thereof.

* * * * *